(12) United States Patent
Debray (10) Patent No.: US 8,141,575 B2
(45) Date of Patent: Mar. 27, 2012

(54) VALVE AND PRODUCTION METHOD THEREOF

(75) Inventor: Alexis Debray, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 904 days.

(21) Appl. No.: 12/125,614

(22) Filed: May 22, 2008

(65) Prior Publication Data
US 2008/0295891 A1    Dec. 4, 2008

(30) Foreign Application Priority Data

May 31, 2007    (JP) ................................ 2007-144486

(51) Int. Cl.
    *F16K 17/38*    (2006.01)
(52) U.S. Cl. ............................ 137/74; 251/11; 220/89.4
(58) Field of Classification Search .................... 137/72, 137/74; 251/11; 220/89.4
    See application file for complete search history.

(56) References Cited

U.S. PATENT DOCUMENTS

| | | | | |
|---|---|---|---|---|
| 3,466,224 A | * | 9/1969 | Vaughn | 428/216 |
| 4,232,796 A | * | 11/1980 | Hudson, Jr. et al. | 220/89.4 |
| 4,240,573 A | * | 12/1980 | Hudson, Jr. | 228/184 |
| 4,313,453 A | | 2/1982 | Holmes | |
| 5,154,201 A | * | 10/1992 | Yanagihara et al. | 137/72 |
| 5,320,127 A | * | 6/1994 | Yanagihara et al. | 137/72 |
| 5,526,385 A | | 6/1996 | Stockhausen et al. | |
| 6,575,188 B2 | * | 6/2003 | Parunak | 137/251.1 |
| 6,949,385 B1 | * | 9/2005 | Burns et al. | 137/74 |
| 2003/0019522 A1 | | 1/2003 | Parunak | |

FOREIGN PATENT DOCUMENTS

JP    05-065181 A    3/1993

OTHER PUBLICATIONS

K. W. Oh and C. H. Ahn., "A Review of Microvalves", J. Micromech. Microeng. 16, pp. 13-39, 2006.
L. J. Guerin, O.Dubochet, J. -F. Zeberli, Ph. Clot, and Ph. Renaud,"Miniature One-shot Valve", In IEEE MEMS Conference, pp. 425-428, 1998.
P. Griss, H. Andersson , and G.Stemme, "Expandable Microspheres for the Handling of Liquids", Lab Chip, 2, pp. 117-120, 2002.
J. T. Santini, A. C. Richards, R.Scheidt, M. J. Cima, and R. Langer, "Microchips as Controlled Drug-delivery Devices", Angew. Chem. Int. Ed. 39, pp. 2396-2407, 2000.

* cited by examiner

*Primary Examiner* — John Rivell
(74) *Attorney, Agent, or Firm* — Fitzpatrick, Cella, Harper & Scinto (57) ABSTRACT

A valve includes a silicon substrate having first and second surfaces, a channel having an opening extending between both surfaces of the silicon substrate, and a metal pattern on the first surface of the silicon substrate. The metal pattern surrounds the opening on the first surface of the silicon substrate but does not close the opening. In addition, a low melting point metal member is disposed on the surface of the silicon substrate. The low melting point metal member covers at least a part of the metal pattern and completely closes the opening on the first surface of the silicon substrate.

21 Claims, 5 Drawing Sheets

ALLOY PART

FIG. 7B

CHANNEL

VALVE AND PRODUCTION METHOD THEREOF

BACKGROUND OF THE INVENTION

1. Field of the Invention

The present invention relates to a valve and a production method thereof.

2. Description of the Related Art

Since 1980, there have been disclosed various valves produced by a microprocessing technology (hereinafter, referred to as "microprocessed valve") (see, for example, K. W. Oh and C. H. Ahn., "A review of microvalves", J. Micromech. Microeng. 16, R13-R39, 2006)

According to the disclosures thereof, the microprocessed valves are classified mainly into two categories of passive valves and active valves.

On the other hand, as another microprocessed valve, there is known a microprocessed valve including, for example, a one-shot valve designed to operate only once.

As the application of the one-shot valve, it is effective to use the one-shot valve as a valve for triggering a mixing reaction in a lab-on-a-chip or as a valve for delivering a medicine sample to a smart micro pill.

In a case where the one-shot valve of those applications is structured as a temperature actuated valve which is operated depending on temperature, the one-shot valve can be used for pressure release of a fuel cell for use in, for example, a small portable device, having a small fuel tank.

That is, the one-shot valve can be applied to a rupture system for releasing a pressure when a pressure in a fuel tank is abnormally high due to temperature rise.

The term "microprocessed one-shot valve" herein employed refers to an operation valve which is designed to operate only once and produced by a microprocessing technology as described above.

Hitherto, there has been disclosed a microprocessed one-shot valve which operates depending on temperature and pressure (see A. Debray, M. Shibata, and H. Fujita, "one-shot micro-valve with temperature dependent operation", In Proceeding of the Power MEMS 2006 Conference, pp. 137-140, 2006).

This document discloses a microprocessed one-shot valve having a structure in which an upper end of a channel bored in a silicon wafer is blocked by an underlayer formed by stacking chromium and copper and a low melting point alloy coating an upper portion thereof.

When the temperature of the microprocessed one-shot valve is higher than the melting point of the alloy and the pressure difference between the inside and the outside of the channel is high enough to break the chromium/copper layer, the valve is in an open state. In this case, the pressure difference is normally set to 100 kPa or more.

A reason for this setting is to reduce a risk of breakage of the underlayer during a production process, because when the underlayer is designed to be broken at a pressure difference of less than 100 kPa, strength of the underlayer becomes lower.

Accordingly, this structure is suitable in designing a valve which opens at a pressure difference of 100 kPa or more.

Further, thermal expansion ratios of chromium and copper which constitute the underlayer are different from each other. Accordingly, the breakage strength of the underlayer depends on a temperature in some cases.

Therefore, in order to realize the underlayer which is opened at a predetermined temperature or a predetermined pressure difference, caution is required.

On the other hand, O. Guerin, L. J. O. Dubochet, J. -F. Zeberli, Ph. Clot, and Ph. Renaud, "Miniature one-shot valve", In IEEE MEMS Conference, pp. 425-428, 1998 discloses another microprocessed one-shot valve.

According to the microprocessed one-shot valve as disclosed in this document, a closed micro channel is opened by melting of a polyethylene layer.

Accordingly, the temperature at which the microprocessed one-shot valve is operated can be set depending on the melting temperature of polyethylene.

Further, P. Griss, Andersson H., and G. Stemme, "Expandable microspheres for the handling of liquids", Lab Chip, 2, pp. 117-120, 2002 discloses still another microprocessed one-shot valve formed with microspheres.

In the microprocessed one-shot valve as disclosed in this document, the volume of the expandable microspheres increases about 60 times larger at a set temperature or more.

The microspheres inserted into the channel close the channel when expanded.

The microprocessed one-shot valve is structured so as to be capable of switching from an open position to a closed position.

Further, J. T. Santini, A. C. Richards, R. Scheidt, M. J. Cima, and R. Langer, "Microchips as controlled drug-delivery devices", Angew. Chem. Int. Ed. 39, pp. 2396-2407, 2000 discloses still another microprocessed one-shot valve triggered by a current.

The microprocessed one-shot valve is disposed in a cistern mounted to an inner portion of a silicon wafer.

To an upper portion of the cistern, a metal layer serving as an anode is deposited. Another metal layer serving as a cathode is deposited to a side of the cistern.

By putting the microprocessed one-shot valve into an electrolyte and imparting a potential difference between the anode and the cathode, the anode is oxidized. After that, the anode metal layer is dissolved in the electrolyte. With this mechanism, switching from the closed position to the open position is performed.

Further, U.S. Pat. No. 4,313,453 discloses a thermally operated valve.

The thermally operated valve is a member sealed by a solder to an inner portion of a connection portion at which two metal pipings are connected to each other, and stops flow in the metal pipings. By applying heat to the solder, the solder is melted, the thermally operated valve is opened, and flow in the metal pipings is enabled.

Further, U.S. Pat. No. 5,526,385 discloses a safety device used for protection against abnormal overpressure of a nuclear reactor pressure vessel.

The safety device has a structure in which a pressure compensation opening is sealed by a solder. During a normal operation, the solder has a solid form and the pressure compensation opening is closed. At a higher temperature, the solder is melted.

Further, by overpressure in a pipe, a melting solder is pushed to open the pressure compensation opening of the pipe.

The inventions according to the above-mentioned conventional examples have several problems as described below.

For example, when a temperature sensitive microprocessed one-shot valve is used, it is desirable that the operation temperature of the temperature sensitive microprocessed one-shot valve can be set variously depending on an intended purpose.

However, in the case of the microprocessed valve as disclosed in A. Debray, M. Shibata, and H. Fujita, "one-shot micro-valve with temperature dependent operation", In Proceeding of the Power MEMS 2006 Conference, pp. 137-140, 2006, the production of the microprocessed valve which opens at a pressure difference smaller than 100 kPa becomes difficult in some cases. Further, depending on the material structure of the underlayer, there may be a case where a design providing an accurate opening pressure difference becomes difficult.

Further, in the case of the microprocessed valve as disclosed in O. Guerin, L. J. O. Dubochet, J.-F. Zeberli, Ph. Clot, and Ph. Renaud, "Miniature one-shot valve", In IEEE MEMS Conference, pp. 425-428, 1998, desirable operation temperature cannot be set depending on an intended purpose.

On the other hand, in order to use the microprocessed valve for releasing a pressure, switching from the closed position to the open position is necessary.

On the contrary, in the case of the microprocessed valve as disclosed in P. Griss, Andersson H., and G. Stemme, "Expandable microspheres for the handling of liquids", Lab Chip, 2, pp. 117-120, 2002, in the operation of the microprocessed valve, switching only from the open position to the closed position is possible.

Further, in order to use the microprocessed valve as a pressure release mechanism or various liquid-feeding initiation mechanisms for a fuel tank, it is required that the microprocessed valve can operate in an arbitrary use environment.

On the contrary, in the case of the microprocessed valve as disclosed in J. T. Santini, A. C. Richards, R. Scheidt, M. J. Cima, and R. Langer, "Microchips as controlled drug-delivery devices", Angew. Chem. Int. Ed. 39, pp. 2396-2407, 2000, the operation of the valve is limited by an electrolyte environment.

Further, the microprocessed one-shot valve has the following characteristic points in addition to a point that the microprocessed one-shot valve is used while being incorporated in a small system.

One characteristic point is that the microprocessed one-shot valve has high sensitivity to an ambient temperature because it is small.

The microprocessed one-shot valve has this high sensitivity because thermodiffusion has a faster influence on the valve of a smaller size.

Another characteristic point is that, because a microprocessing technique, in particular, a MEMS technique can be used for the production method, batch production for producing multiple devices at the same time on the same support body is enabled.

This enables reduction in production costs and manufacture of a control mechanism such as a heater at the same time and directly in the vicinity of the microprocessed one-shot valve.

However, in examples using a solder as disclosed in U.S. Pat. Nos. 4,313,453 and 5,526,385, the production has to be achieved by a typical macro technique.

Accordingly, the size of the device cannot be reduced to 2 to 3 mm³ or smaller. Further, the production cannot employ the batch processing.

In addition, the control mechanism such as a heater cannot be directly incorporated.

The problems to be solved in the temperature sensitive microprocessed one-shot valves described above can be summed up as follows.

When an ambient temperature is higher than a predetermined temperature $T_c$ and when a pressure is higher than a predetermined pressure $P_c$, a pressurized fluid (gas or liquid) needs to be ejected.

That is, the valve has to be structured such that, at a temperature equal to or lower than the predetermined temperature, the valve connected to a tank accommodating a pressurized gas or liquid is kept closed, and at a temperature equal to or higher than the predetermined temperature, the valve is opened.

In this case, it is desirable that the opening temperature of the valve can be set to an arbitrary temperature, and the valve can be used in both a liquid environment and a gas environment.

Further, the valve has a small size which is typically smaller than a size of 2 to 3 mm³.

Further, the production method therefor is of a batch mode. In order to trigger the opening on demand, it is necessary that a heater be easily incorporated into the system.

Further, at the time of opening the valve, when there exist contents other than a fluid to be released, for example, solid substances or solid particles, it is desirable that scattering thereof can be prevented. In this case, the channel itself can function as a filter.

SUMMARY OF THE INVENTION

The present invention is directed to a valve having a structure in which the opening temperature of the valve can be set to an arbitrary temperature, scattering of contents other than a fluid is suppressed, and the valve can be used in both a liquid environment and a gas environment and can also be reduced in size.

Further, the present invention is directed to a production method enabling production of the valve in a batch mode by incorporating a heater.

The present invention provides a valve structured as described below and a production method thereof.

According to the present invention, the valve includes: a silicon substrate; a channel having an opening extending between both surfaces of the silicon substrate; a metal layer formed on one of the surfaces of the silicon substrate without closing the opening of the channel; and a low melting point metal member deposited so as to cover at least a part of the metal layer and to block the opening of the channel.

Further, according to the present invention, the method of producing a valve includes: forming a channel in a silicon substrate, the channel having an opening penetrating an entire thickness of the silicon substrate; forming, by patterning, a metal layer on one surface of the silicon substrate so as not to close the opening of the channel; and depositing a low melting point metal member so as to cover at least a part of the metal layer and also to block the opening of the channel.

According to the present invention, there can be realized a microprocessed one-shot valve having a structure in which the opening temperature of the valve can be set to an arbitrary temperature, scattering of contents other than a fluid is suppressed, and the valve can be used in both a liquid environment and a gas environment and can also be reduced in size.

Further, there can be realized a production method enabling production of the microprocessed one-shot valve in a batch mode by incorporating a heater.

Further features of the present invention will become apparent from the following description of exemplary embodiments with reference to the attached drawings.

BRIEF DESCRIPTION OF THE DRAWINGS

FIGS. 7A and 7B are photographs for explaining a microprocessed one-shot valve actually produced, to which the present invention is applied, in which

DESCRIPTION OF THE EMBODIMENTS

In this embodiment, a microprocessed one-shot valve can be constituted of: a silicon substrate; a channel having an opening formed penetrating the entire thickness of the substrate extending between the both surfaces of the silicon substrate; a metal layer formed on one of the surfaces of the silicon substrate so that the opening of the channel is prevented from by being closed; and a low melting point metal member deposited so as to cover at least a part of the metal layer and also to block the opening of the channel.

According to the microprocessed one-shot valve of this embodiment, a microprocessing technology is used, so that the size thereof can be reduced to be smaller than 2 to 3 mm³.

Accordingly, as described above, the sensitivity to change in ambient temperature becomes higher, so that the operation temperature can be set more accurately.

Further, the production by a batch processing is enabled, so that the production costs can be reduced and the mounting of a heater can be simplified through simultaneous formation.

Further, the diameter of the channel or the diameter of the opening of the channel can be reduced to 1 μm.

Accordingly, the channel can be used as a filter.

For example, a powder of a hydrogen storage alloy is assumed to be a hydrogen releasing material for a micro fuel cell.

When the microprocessed one-shot valve is opened, the channel can be used as a filter for preventing dispersion of the hydrogen storage alloy powder.

The powder of a hydrogen storage alloy to be used as a hydrogen storage material is produced by hydrogen pulverization or mechanical pulverization of the hydrogen storage alloy.

When the particle diameter of the powder of the hydrogen storage alloy is too small, a flow path of a hydrogen gas at the time of storage/release of hydrogen cannot be ensured. Accordingly, the storage amount may fluctuate, or a long period of time is required for storage/release. Further, when the particle diameter of the powder of the hydrogen storage alloy is too large, the specific surface area becomes smaller, and a longer period of time is required for storage/release.

Therefore, the particle diameter of the powder of the hydrogen storage alloy can be set within a range from 10 μm to 500 μm. Therefore, in order to allow the channel of the microprocessed one-shot valve to function as a filter, the diameter of the channel is preferably set to be 10 μm or more and less than 500 μm.

Further, the hydrogen storage alloy may become finer owing to repetition of storage/release of hydrogen. In this case, it is sufficient that the diameter of the channel is set to an estimated powder diameter of the powder or less. As a result, the diameter of 1 μm or more and less than 500 μm is desirable and the diameter of 1 μm or more and less than 300 μm is more desirable. The size of the powder seldom becomes 1 μm or less, so that the channel functions as a filter well.

Further, according to the microprocessed one-shot valve of this embodiment, the physical state (liquid state or solid state) of the low melting point metal member changes depending on the temperature, thereby changing the mechanical strength against a pressure applied from the channel side.

When the low melting point metal member is in a solid state, the channel is closed. When the low melting point metal member is in a liquid sate, the low melting point metal member is broken by the pressure applied from the channel side, thereby opening the channel.

The melting temperature of the low melting point metal member can be arbitrarily set based on the material composition thereof.

Specifically, the melting temperature can be set to 47 degrees Celsius to a several hundred degrees Celsius in increments of 2 to 3 degrees Celsius. Accordingly, the operation temperature of the microprocessed one-shot valve can be adjusted finely.

Further, according to this embodiment, the channel is closed by only the low melting point metal member. Accordingly, the operation temperature of the microprocessed one-shot valve can be accurately set based on the melting point of the alloy.

Further, the opening pressure depends only on the diameter of the channel and a fluid/low melting point alloy interfacial energy, so that the design of the opening pressure difference becomes easier. Accordingly, such a design that enables a low pressure operation in which the opening pressure difference is lower than 100 kPa can be achieved.

Hereinafter, with reference to the drawings, specific embodiments of the present invention are described.

Embodiment 1

In Embodiment 1 of the present invention, a microprocessed one-shot valve to which the present invention is applied and a production method thereof are described.

Figure 1:
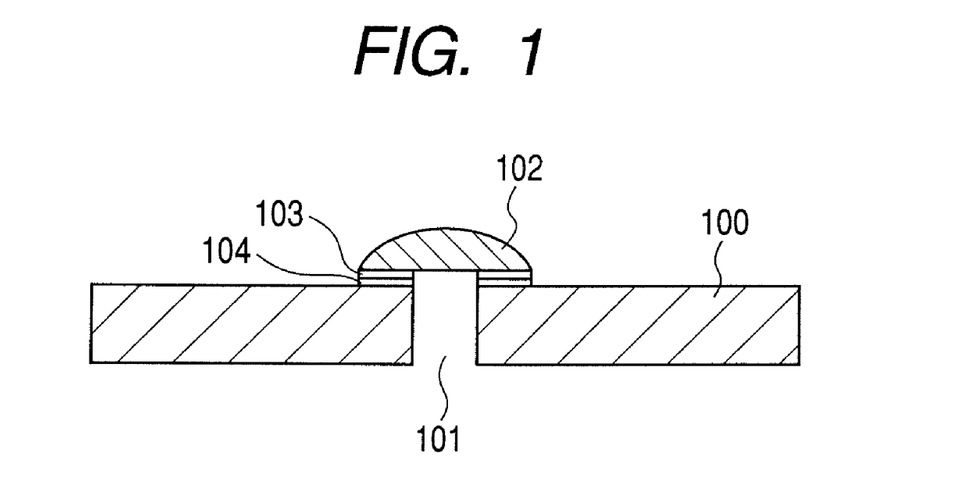
FIG. 1 is a schematic cross-sectional view illustrating a structural example of a microprocessed one-shot valve according to Embodiment 1 of the present invention.

FIG. 1 is a cross-sectional view illustrating the microprocessed one-shot valve according to this embodiment.

FIG. 1 illustrates a silicon substrate 100, a channel 101, a low melting point metal member 102, a metal layer 103, and an adhesive layer 104.

The basic structure of the microprocessed one-shot valve of this embodiment includes, as illustrated in FIG. 1, the channel 101 formed penetrating the entire thickness of the silicon substrate 100, and the low melting point metal member 102 deposited onto the channel 101.

Next, the production method of the microprocessed one-shot valve according to this embodiment is described. First, a mask for deep RIE (reactive ion etching) is formed on a rear surface of the silicon substrate 100.

In this case, although depending on a size, a number of microprocessed one-shot valves can be produced from a single silicon substrate through batch processing. Therefore, the mask is formed in advance at a position at which the channel 101 is to be formed for each of the microprocessed one-shot valves.

Incidentally, the mask is preferably solvent-resistant and can be made of aluminum or silicon dioxide.

On a surface of the silicon substrate 100, opposite to the surface on which the mask is formed, an adhesive layer including chromium or titanium as a main component thereof is formed as the adhesive layer 104.

Further, the metal layer 103 is formed and is patterned.

As the metal material of the metal layer 103, a material containing copper as a main component thereof can be used.

The formation of the metal layer 103 can be performed by a sputtering method for preventing formation of pinholes in the formed metal layer.

Incidentally, both a pattern of the mask for deep RIE and a pattern of the metal layer can be formed by a well-known technology, when the patterns have a pattern size of 1 µm or more.

Accordingly, the pattern formation can be performed by photolithography and metal etching, or a lift-off process.

In this case, as illustrated in FIG. 1, the patterns of the adhesive layer 104 and the metal layer 103 are formed so as not to cover a portion of the opening of the channel 101.

The patterns of this case are formed in each of positions of the number of microprocessed one-shot valves produced from a single substrate. By using the mask formed in advance on the rear surface of the silicon substrate 100, by the deep RIE, etching is performed so that the entire thickness of the silicon substrate 100 is penetrated, thereby forming the channel 101.

Next, the silicon substrate 100 is dipped in a two-phase liquid bath containing two phases, that is, melted low melting point metal at a bottom portion and dilute hydrochloric acid of pH=1 at an upper portion.

This method is described in detail in D. H. Gracias, J. Tien, T. L. Breen, C. Hsu, and G. M. Whitesides, "Forming electrical network in three dimensions by self-assembly", Science, 289th edition, pp. 1170-1172, 2000.

First, by the dilute hydrochloric acid, natural copper oxide formed on the surface of the copper layer is etched.

However, the oxide layer formed on the surface of the aluminum layer will not be etched by the dilute hydrochloric acid.

The interfacial energy between water and copper is larger than the interfacial energy between the low melting point metal and copper, so that the copper layer is coated by the low melting point metal.

On the other hand, interfacial energies between water and other substances (such as aluminum oxide, silicon dioxide, and silicon) are smaller than interfacial energies between the low melting point metal and those substances.

Accordingly, the substances will not be coated by the low melting point metal.

However, in a case where the diameter of the channel 101 is sufficiently small and the pattern of the copper layer 103 is present so as to surround the periphery of the channel 101, as illustrated in FIG. 1, the low melting point metal member 102 can be formed so as to close a portion above the channel 101.

In this case, the low melting point metal member can be selected from alloys containing at least one element of Bi, Sn, Pb, In, and Cd.

Further, although depending on the surface energy or viscosity of the low melting point metal in a melted state, the pattern shape of the metal layer 103, the processing conditions, or the like, this structure can be formed when the diameter of the channel 101 is less than 500 µm.

Finally, the plurality of microprocessed one-shot valves produced in the single substrate is cut to be separated in a predetermined size.

Incidentally, with reference to FIG. 1, the orientation of the microprocessed one-shot valve during use is such an orientation that a pressure difference is positive in a direction from the channel 101 to the surface of the microprocessed one-shot valve, that is, toward the low melting point metal member 102.

Hereinafter, the melting temperatures of the low melting point metals, which depends on the material composition of the low melting point metal which can be used in the present invention are simply described.

Data is obtained according to "Material safety data sheet of indalloy metal mix containing bismuth", published by Indium Corporation of America-Europe-Asia-Pacific and "Bismuth alloys", published by Small Parts Inc., http://www.smallparts.com/products/descriptions/lma.cfm, 2006.

When the composition of the low melting point metal is Bi 44.7%, Pb 22.6%, Sn 8.3%, Cd 5.3%, and In 19.1%, the melting temperature of the low melting point metal is 47 degrees Celsius. This is an example of an extremely low melting temperature. When the composition of the low melting point metal is changed to Bi 44.7%, Pb 22.6%, Sn 11.3%, Cd 5.3%, and In 16.1%, the melting temperature of the low melting point metal is raised to 52 degrees Celsius. Accordingly, by changing the composition slightly, the melting temperature of the low melting point metal changes slightly.

A higher melting temperature can also be employed when the composition can be finely adjusted. For example, with a composition of Bi 33.33%, Sn 33.33%, and Pb 33.34%, a melting temperature of 143 degrees Celsius is obtained. On the other hand, with a composition of Bi 60% and Cd 40%, a melting temperature of 144 degrees Celsius is obtained.

A low melting point metal pursuant to ROHS Directive (lead-free and cadmium-free) can also be applied to the present invention.

For example, with a composition of, for example, Bi 32.5%, Sn 16.5%, and In 51%, a melting temperature of 60 degrees Celsius is obtained.

Further, with a composition of Bi 5% and In 95%, a melting temperature of 150 degrees Celsius is obtained. Further, with a composition of Bi 100%, a melting temperature of 271 degrees Celsius is obtained.

Accordingly, it can be seen that a wide range of melting temperatures can be utilized in RoHS Directive.

On the other hand, the channel 101 can be allowed to function as a filter for preventing scattering of a solid content at a time of opening the microprocessed one-shot valve.

In this case, the diameter of the channel 101 is set to be smaller than the size of the content.

On the other hand, the length of the channel 101 is defined by a thickness of the substrate. In a production process of the microprocessed one-shot valve, the thickness of a substrate which can be normally treated is 200 µm or more when the diameter of the substrate is 3 or 4 inches.

When the diameter of the substrate is larger, the substrate is required to be thicker. The channel formed by the deep RIE is a straight channel, so that when the diameter of the channel 101 is too small relative to the thickness, the flow resistance becomes higher.

In such a case, in order to reduce the flow resistance, a channel having a tapered wall can be formed.

That is, wet etching of silicon may be performed, for example, KOH or TMAH may be used, which is an ordinary silicon etchant.

In this case, as a mask on the rear surface of the substrate 100, with respect to those etchant, for example, silicon nitride is used with respect to KOH, and silicon dioxide is used with respect to TMAH.

During the wet etching, the surface of the substrate 100 is protected by ordinary macroscopic protection such as Teflon (trade name; manufactured by DuPont) cover.

In a case of a specific application, the adhesive force of the low melting point metal member 102 with respect to the silicon substrate 100 is too weak so that the low melting point metal member 102 is detached from the silicon substrate 100. Accordingly, there is a possibility that the microprocessed one-shot valve may open at a temperature lower than the melting temperature of the low melting point metal.

In this case, by employing the following method, the adhesive force of the low melting point metal member 102 with respect to the silicon substrate 100 can be increased.

That is, the temperature of the low melting point metal member 102 is set to be higher than the melting temperature of the metal material constituting the low melting point metal member 102, and a pressure difference is applied between the both ends of the channel, thereby allowing the low melting point metal member 102 to partially intrude into the channel.

Specifically, first, the temperature of the low melting point metal member 102 is raised to be higher than the melting temperature at which the low melting point metal member 102 melts, and a pressure difference in a direction opposite to that in the normal operation of the microprocessed one-shot valve is applied to the channel.

That is, a pressure difference is applied between an upper portion of the low melting point metal member 102 and the channel 101 of FIG. 1 such that the pressure at a portion above the low melting point metal member 102 is higher than the pressure at the channel.

As a result, the melted low melting point metal member 102 intrudes into the channel 101 to some extent. By lowering the temperature of the low melting point metal member 102 with the pressure difference being retained, the low melting point metal member 102 solidifies at that position.

By allowing the low melting point metal member 102 to intrude into the channel 101 to some extent, the contact surface between the silicon substrate 100 and the low melting point metal member 102 increases.

Further, the increased contact surface is in parallel to a direction of a force generated from the pressure difference applied to the low melting point metal member 102 during the normal operation.

The adhesive force of the low melting point metal member 102 with respect to the silicon substrate 100 is more resistant to a shearing force existing at a boundary surface between the low melting point metal member 102 and the silicon substrate 100 which is parallel to an upper layer of the silicon substrate 100 than to a tensile force generated from the same pressure difference.

The pressure to be applied for allowing the low melting point metal member 102 to intrude into the channel 101 may be a pressure of a liquid or a gas. Further, the pressure can be easily controlled by a pressure reducing valve. The pressure can be applied to all the plural microprocessed one-shot valves formed by a batch mode, that is, on a single substrate, and then those microprocessed one-shot valves can be separated from each other.

Figure 6:
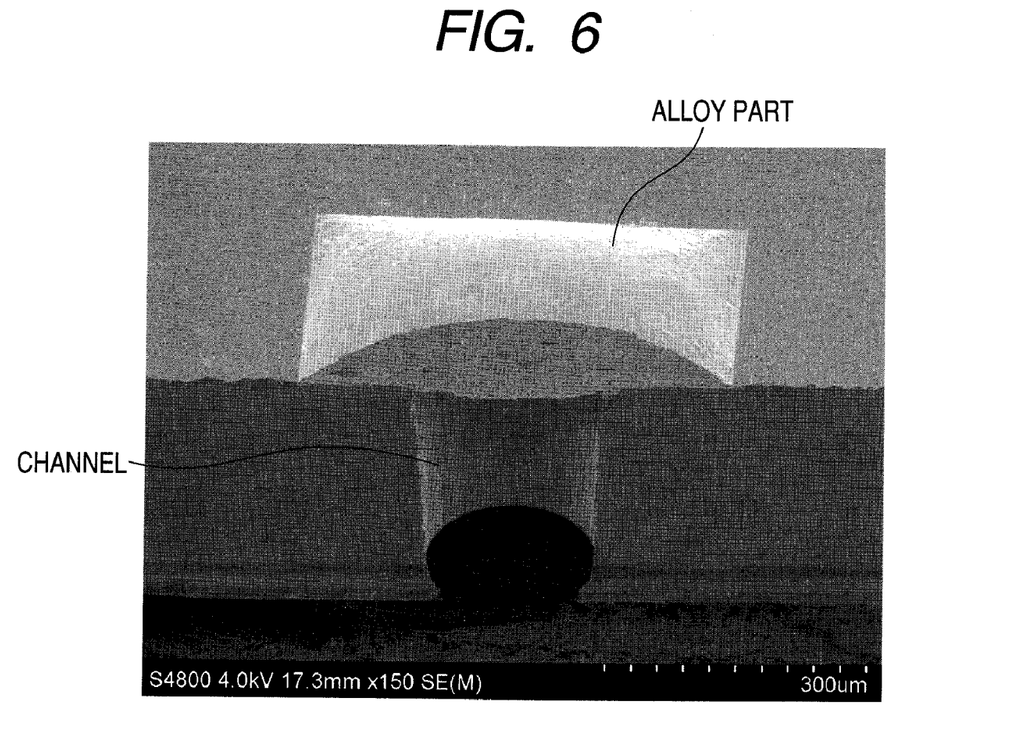
FIG. 6 is a photograph which shows an example of a microprocessed one-shot valve actually produced and is taken in a direction oblique to a cross section of the microprocessed one-shot valve.

FIG. 6 is a photograph which shows an example of a microprocessed one-shot valve actually produced by application of the present invention. The photograph has been taken in a direction oblique to a cross section of the microprocessed one-shot valve. There is observed a state where a channel is formed in a silicon substrate, and the inlet of the channel is covered with a low melting point metal member.

It can be seen from the above observation image that the microprocessed one-shot valve according to the present invention is practically utilizable. In particular, the microprocessed one-shot valve having the opening of the channel blocked with the low melting point metal member can be obtained by the method of the present invention, and it can be seen that the low melting point metal does not intrude into the channel.

Figure 7A:
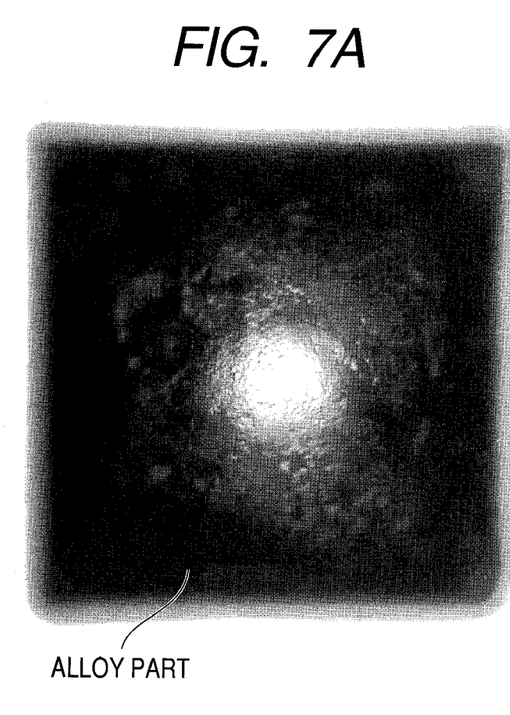
FIG. 7A is a photograph taken from above the microprocessed one-shot valve in a closed state at a temperature equal to or lower than the operation temperature of the microprocessed one-shot valve.
Figure 7B:
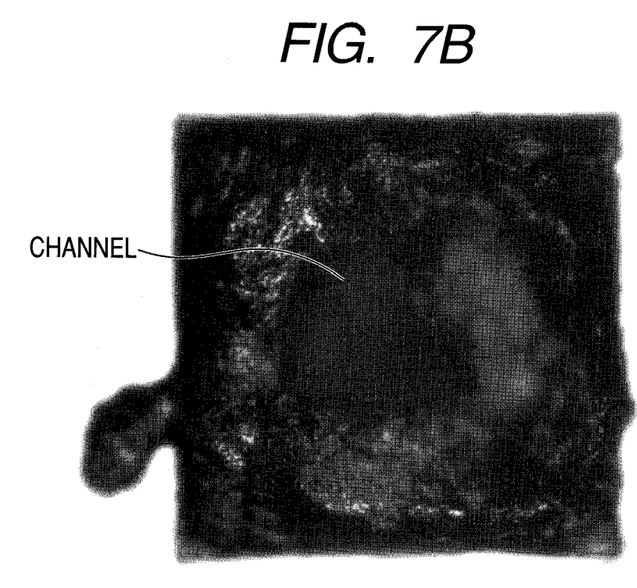
FIG. 7B is a photograph of a state after the ambient temperature of the microprocessed one-shot valve is raised and a pressure difference is applied to the microprocessed one-shot valve, to thereby open the microprocessed one-shot valve.

FIGS. 7A and 7B are photographs for explaining a microprocessed one-shot valve actually produced, to which the present invention is applied.

FIG. 7A is a photograph which is taken from above the microprocessed one-shot valve in the closed state at a temperature lower than the operation temperature of the microprocessed one-shot valve, and shows an optical microscope image of the upper surface of the microprocessed one-shot valve corresponding to Embodiment 1 before the microprocessed one-shot valve is actuated.

In FIG. 7A, a black portion which seems to have a substantially rectangular shape is the low melting point metal member, and the length of the bar in the figure is 100 µm.

FIG. 7B illustrates a state after the ambient temperature of the microprocessed one-shot valve is raised and a pressure difference is applied to the microprocessed one-shot valve, thereby opening the microprocessed one-shot valve.

Here, FIG. 7B shows an optical microscope image of the upper surface of the same microprocessed one-shot valve after the ambient temperature has been raised to 60° C. and the pressure difference of the channel is raised to 10.1 kPa, thereby performing the opening operation. The length of the bar in the figure is 100 µm, and the low melting point metal member is removed, thereby opening the channel (portion of a black circular shape at a center).

Incidentally, in the example shown in FIGS. 7A and 7B, there is used a low melting point metal having a melting point of 47° C., the pressure difference applied to the microprocessed one-shot valve is set to 2.5 atm, and the microprocessed one-shot valves is opened at ambient temperature of about 49° C.

Further, Table 1 below shows results of measurement of the opening pressure difference with the channel diameter being changed. The results show that, when the channel diameter is 200 µm, the opening pressure difference is 10.1 kPa, and when the channel diameter is 100 µm, the opening pressure difference is 24.7 kPa.

TABLE 1

|  | Sample 1 | Sample 2 |
| --- | --- | --- |
| Channel diameter (µm) | 200 | 100 |
| Opening pressure difference (kPa) | 10.1 | 24.7 |

Embodiment 2

In Embodiment 2 of the present invention, a structural example of a microprocessed one-shot valve is described, in which, when the microprocessed one-shot valve is opened, clogging of solid content powder to be scattered is suppressed.

Figure 2:
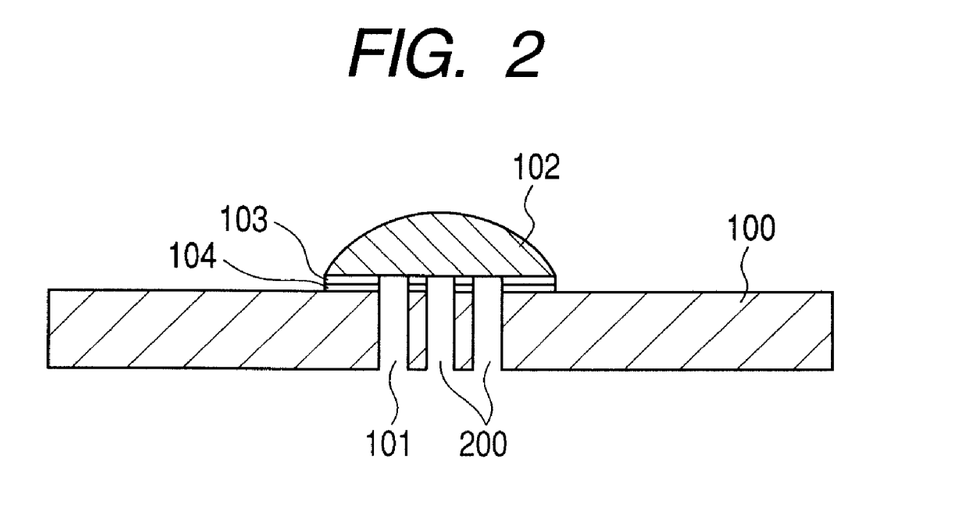
FIG. 2 is a schematic cross-sectional view illustrating a structural example of a microprocessed one-shot valve according to Embodiment 2 of the present invention.

FIG. 2 is a cross-sectional view illustrating the microprocessed one-shot valve according to this embodiment.

In FIG. 2, the same structural components as those of FIG. 1 are denoted by the same reference numerals, and descriptions of those are omitted.

In FIG. 2, a plurality of channels 200 are formed.

The microprocessed one-shot valve of this embodiment has a structure in which, in order to reduce flow path resistance due to clogging of the solid content powder to be scattered, the diameter of the channel is controlled.

When the solid content powder to be scattered covers the inlet of the channel 101, the flow path resistance of the channel 101 becomes larger.

By forming the plurality of channels 200 below the low melting point metal member 102, the flow path resistance can be reduced without making the channel 101 larger.

With the provision of the plurality of channels 200, the microprocessed one-shot valve becomes less prone to be clogged.

For example, when the one channel 101 is blocked seriously by the solid content powder, the flow path for the fluid can be ensured by the other channels 200.

The multiple channel structures can be produced by any one of the deep RIE (straight channel) or wet etching of silicon (channel having a tapered wall).

However, in the case of the tapered wall, a system becomes larger, and a dead space is required.

Embodiment 3

In Embodiment 3 of the present invention, there is a description of a structural example of a microprocessed one-shot valve, in which the adhesive force between the low melting point metal member and the silicon substrate is increased.

Figure 3:
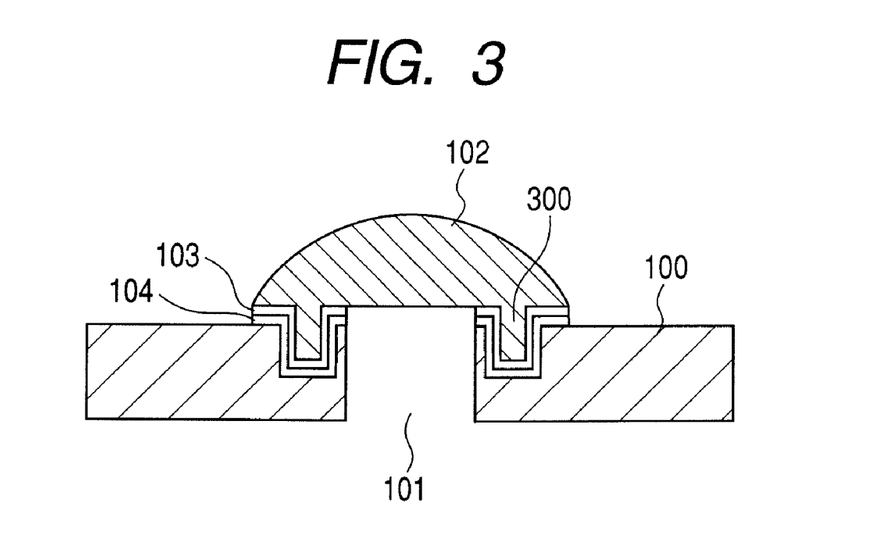
FIG. 3 is a schematic cross-sectional view illustrating a structural example of a microprocessed one-shot valve according to Embodiment 3 of the present invention.

FIG. 3 is a cross-sectional view illustrating the microprocessed one-shot valve according to this embodiment.

In FIG. 3, the same structural components as those of FIG. 1 are denoted by the same reference numerals, and descriptions of those are omitted.

In FIG. 3, there is provided a groove 300 formed in the silicon substrate.

The microprocessed one-shot valve of this embodiment has such a structure that further improves the adhesive force between the low melting point metal member 102 and the silicon substrate 100.

In this embodiment, before a chromium layer is formed as the adhesive layer 104 and a copper layer is formed as the metal layer 103, a groove 300 is formed at the surface of the silicon substrate 100.

The groove 300 can be formed by a technology based on the conventional masking, photolithography, and silicon etching.

Accordingly, for the production of the microprocessed one-shot valve of this embodiment, the same production process as that of Embodiments 1 and 2 can be employed.

The wall of the groove 300 is vertical, and the chromium layer as the adhesive layer 104 and the copper layer as the metal layer 103 are formed by sputtering. Accordingly, the vertical wall of the groove 300 is also covered with the chromium layer as the adhesive layer 104 and the copper layer as the metal layer 103, thereby allowing a part of the low melting point metal member 102 to intrude into the groove 300.

With the provision of the groove 300, the area of the contact surface between the low melting point metal member 102 and the copper layer serving as the metal layer 103 increases.

As a result, the adhesive strength between the low melting point metal member 102 and the silicon substrate 100 is improved.

Further, when the wall of the groove 300 is vertical, by the pressure difference acting on the low melting point metal member 102 and applied to the one-shot valve, a shearing force is generated between the low melting point metal member 102 and the chromium layer serving as the adhesive layer 104.

Accordingly, similarly to the case of Embodiment 1 in which a part of the low melting point metal member 102 intrudes into the channel 101, the adhesive strength of the low melting point metal member 102 with respect to the silicon substrate 100 is increased.

As a matter of course, the number of the groove 300 is not limited to the number illustrated in FIG. 3. In order to further increase the adhesive strength between the low melting point metal member 102 and silicon substrate 100, a plurality of grooves 300 may be provided in the one-shot valve.

Embodiment 4

In Embodiment 4 of the present invention, a description is made of a structural example of a microprocessed one-shot valve, in which an adhesive force of the low melting point metal member 102 is further improved.

Figure 4:
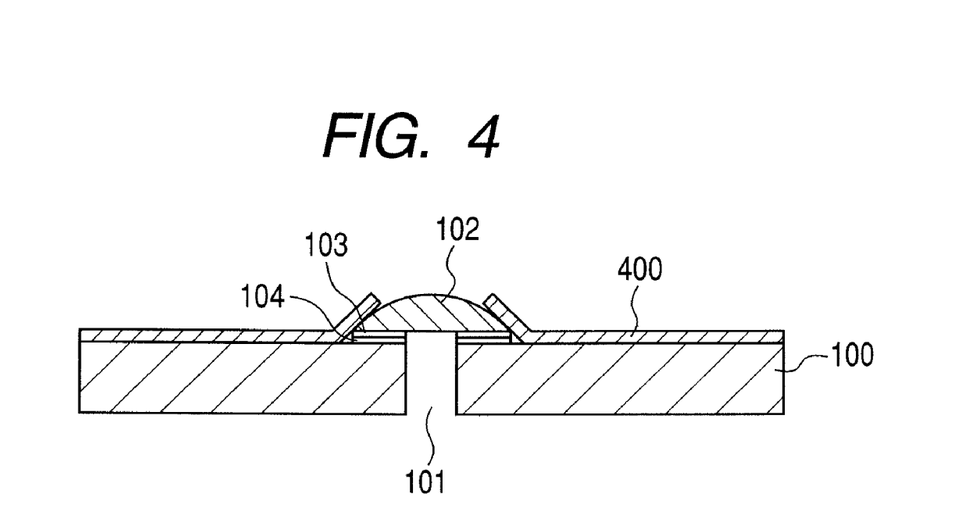
FIG. 4 is a schematic cross-sectional view illustrating a structural example of a microprocessed one-shot valve according to Embodiment 4 of the present invention.

In this embodiment, the surface of the low melting point metal member 102 and the surface of the silicon substrate to which the low melting point metal member 102 is deposited are covered by a photoresist at least partially, thereby improving the adhesive force.

FIG. 4 is a cross-sectional view illustrating the microprocessed one-shot valve according to this embodiment.

In FIG. 4, the same structural components as those of FIG. 1 are denoted by the same reference numerals, and descriptions of those are omitted.

In FIG. 4, a photoresist layer 400 is formed.

The microprocessed one-shot valve of this embodiment is structured so as to improve the adhesive force of the low melting point metal member 102.

This improvement is provided by a single step. On the surface of the one-shot valve of Embodiment 1, the photoresist layer 400 is formed by patterning through photolithography.

FIG. 4 illustrates the structural example in which the improvement is applied to Embodiment 1. However, the improvement in this embodiment can be applied to Embodiment 2, 3, or the like.

The photoresist layer 400 is formed by patterning so as to cover the entire surface of the one-shot valve except an opening portion located at the center of the low melting point metal member 102.

The shape of the opening portion may be a disk shape as needed, or may be another shape.

The area of the contact surface between the photoresist layer 400 and the silicon substrate 100 is larger than the area of the contact surface between the low melting point metal member 102 and the silicon substrate 100.

Accordingly, the adhesive strength between the photoresist layer 400 and the silicon substrate 100 is higher than the adhesive strength between the low melting point metal member 102 and the silicon substrate 100 through intermediation of the chromium layer serving as the adhesive layer 104 and the copper layer serving as the metal layer 103.

Further, the photoresist layer 400 holds the low melting point metal member 102, so that the adhesive strength between the low melting point metal member 102 and the silicon substrate 100 is increased.

The photoresist layer 400 can improve the sealing state against gas leakage which may occur from the inside through a portion between the silicon substrate 100 and the chromium layer serving as the adhesive layer 104, because the contact surface between the silicon substrate 100 and the chromium layer serving as the adhesive layer 104 is winding.

For the photoresist layer 400, there can be used a material having resistance against various solvents and acids, that is, Su-8 (epoxy-based photosensitive material).

As another photoresist material, for example, there can be used a solvent-resistant photoresist material such as an OMR photoresist.

Embodiment 5

In Embodiment 5 of the present invention, a description is made of a microprocessed one-shot valve having a microheater disposed therein.

Figure 5A:
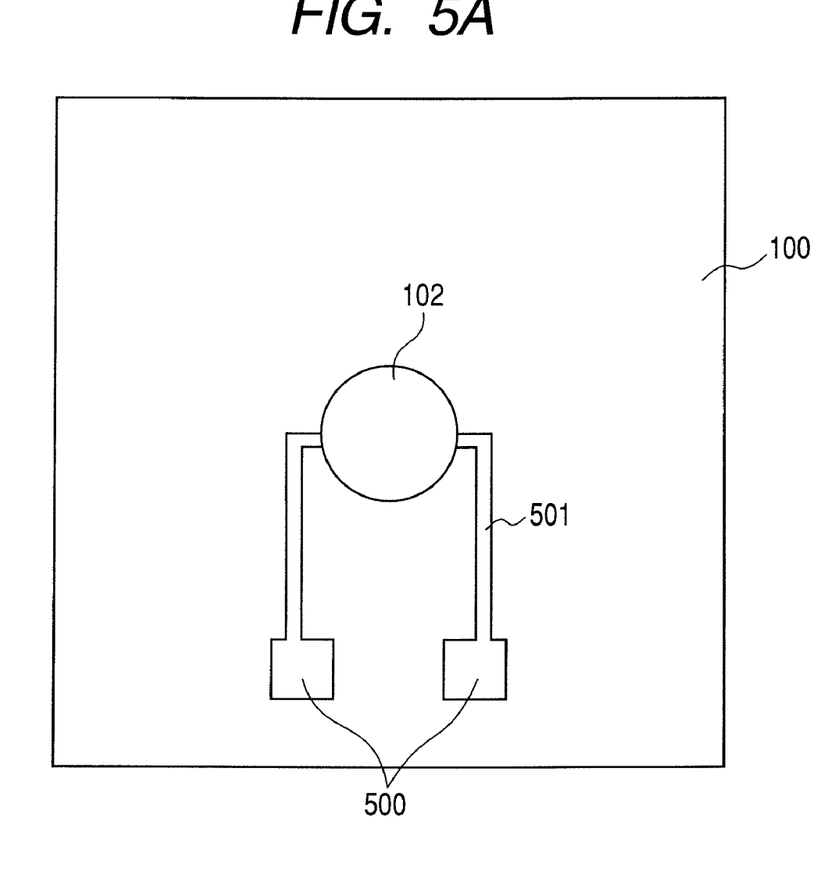
FIGS. 5A and 5B are schematic cross-sectional views illustrating a structural example of a microprocessed one-shot valve according to Embodiment 5 of the present invention.
Figure 5B:
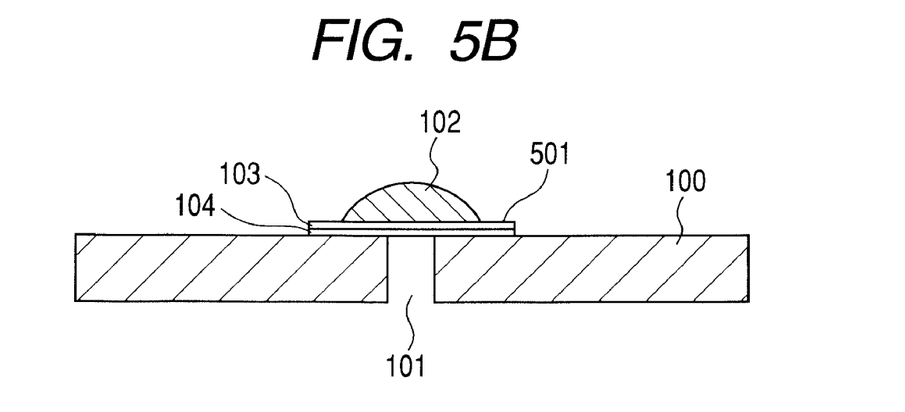

In this embodiment, a heater for heating the low melting point metal member 102 is disposed so that the temperature of the low melting point metal is increased.

FIGS. 5A and 5B are a plan view and a cross-sectional view for illustrating the microprocessed one-shot valve of this embodiment.

In FIGS. 5A and 5B, the same structural components as those of FIG. 1 are denoted by the same reference numerals, and descriptions of those are omitted.

In FIGS. 5A and 5B, there are provided bonding pads 500 and a microresistor 501.

In this embodiment, the microprocessed one-shot valve has the microheater provided therein.

The microheater in this embodiment is constituted of a microresistor 501 passing through the low melting point metal member 102.

The two bonding pads 500 are disposed so as to electrically connect the microheater to the outside.

By allowing a current to flow in the microheater, the temperature of the microheater can be increased, whereby the temperature of the low melting point metal member 102 can be increased.

When the low melting point metal member 102 is melted, a pressure difference is applied, so that the valve can be opened. As a result, on-demand opening of the one-shot valve is enabled. In this case, when an alloy is used as the low melting point metal member 102, by changing the composition thereof, the operation temperature can be adjusted.

The opening operation is controlled by allowing a current to flow in the microheater. Accordingly, depending on the kind of a gas or liquid to be held, the operating temperature can be adjusted so as to be suitably adapted.

For the production of the microprocessed one-shot valve of this embodiment, the same production process as described in Embodiment 1 can be employed.

Concurrently when the chromium layer as the adhesive layer 104 and the copper layer as the metal layer 103 are formed by patterning, pattern formation of the microresistor 501 and the bonding pads 500 of the microheater are also performed.

Before the silicon substrate 100 is dipped in a bath of the melted low melting point metal to form the low melting point metal member 102, the microresistor 501 and the bonding pads 500 of the microheater are covered by a photoresist so that they are not coated by the bath of the low melting point metal.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2007-144486, filed May 31, 2007, which is hereby incorporated by reference herein in its entirety.

What is claimed is:

1. A valve comprising:
a silicon substrate having first and second surfaces;
a channel having an opening extending between both surfaces of the silicon substrate;
a metal pattern on the first surface of the silicon substrate, the metal pattern surrounding the opening on the first surface of the silicon substrate without covering the opening; and
a low melting point metal member on the surface of the silicon substrate, the low melting point metal member covering at least a part of the metal pattern and completely closing the opening on the first surface of the silicon substrate.

2. The valve according to claim 1, wherein the channel has a diameter of 1 µm or more and less than 500 µm.

3. The valve according to claim 1, wherein the channel has a diameter of 1 µm or more and less than 300 µm.

4. The valve according to claim 1, wherein the metal pattern comprises copper as a main component thereof.

5. The valve according to claim 1, further comprising an adhesive layer between the silicon substrate and the metal pattern.

6. The valve according to claim 5, wherein the adhesive layer comprises chromium or titanium as a main component thereof.

7. The valve according to claim 1, wherein the low melting point metal member comprises an alloy containing at least one element of Bi, Sn, Pb, In, and Cd.

8. The valve according to claim 1, wherein the channel is formed in plurality, and the low melting point melting member covers the channels.

9. The valve according to claim 1, wherein a part of the low melting point metal member intrudes into the channel.

10. The valve according to claim 1, wherein a portion on the silicon substrate to which the low melting point metal member is deposited has a groove formed therein.

11. The valve according to claim 1, wherein a surface of the low melting point metal member and a surface of the silicon substrate to which the low melting point metal member is deposited are covered at least partially with a photoresist.

12. The valve according to claim 1, further comprising a heater for heating the low melting point metal member.

13. A valve comprising:
a silicon substrate having first and second surfaces;
a channel having an opening extending between both surfaces of the silicon substrate;
an adhesive layer disposed on the first surface of the silicon substrate and surrounding the opening;
a metal pattern disposed on the adhesive layer and surrounding the opening; and
a low melting point metal disposed on the metal pattern, with the low melting point metal covering the opening on the first surface of the silicon substrate.

14. The valve according to claim 13, wherein the metal pattern comprises copper as a main component thereof.

15. The valve according to claim 13, wherein the adhesive layer comprises chromium or titanium as a main component thereof.

16. The valve according to claim 13, wherein the low melting point metal member comprises an alloy containing at least one element of Bi, Sn, Pb, In, and Cd.

17. The valve according to claim 13, wherein the channel is formed in plurality, and the low melting point melting member covers the channels.

18. The valve according to claim 13, wherein a part of the low melting point metal member intrudes into the channel.

19. The valve according to claim 13, wherein a portion on the silicon substrate to which the low melting point metal member is deposited has a groove formed therein.

20. The valve according to claim 13, wherein a surface of the low melting point metal member and a surface of the silicon substrate to which the low melting point metal member is deposited are covered at least partially with a photoresist.

21. The valve according to claim 13, further comprising a heater for heating the low melting point metal member.

* * * * *